E. A. HENKLE & C. H. DE LA MONTE.
SPEED RECORDER.
APPLICATION FILED DEC. 5, 1907.
914,835.
Patented Mar. 9, 1909.
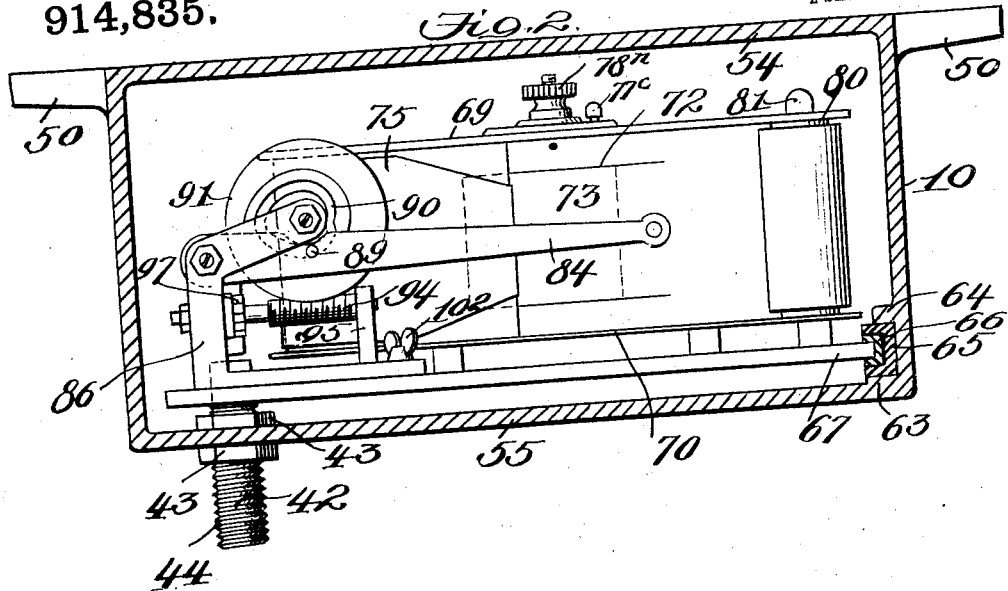
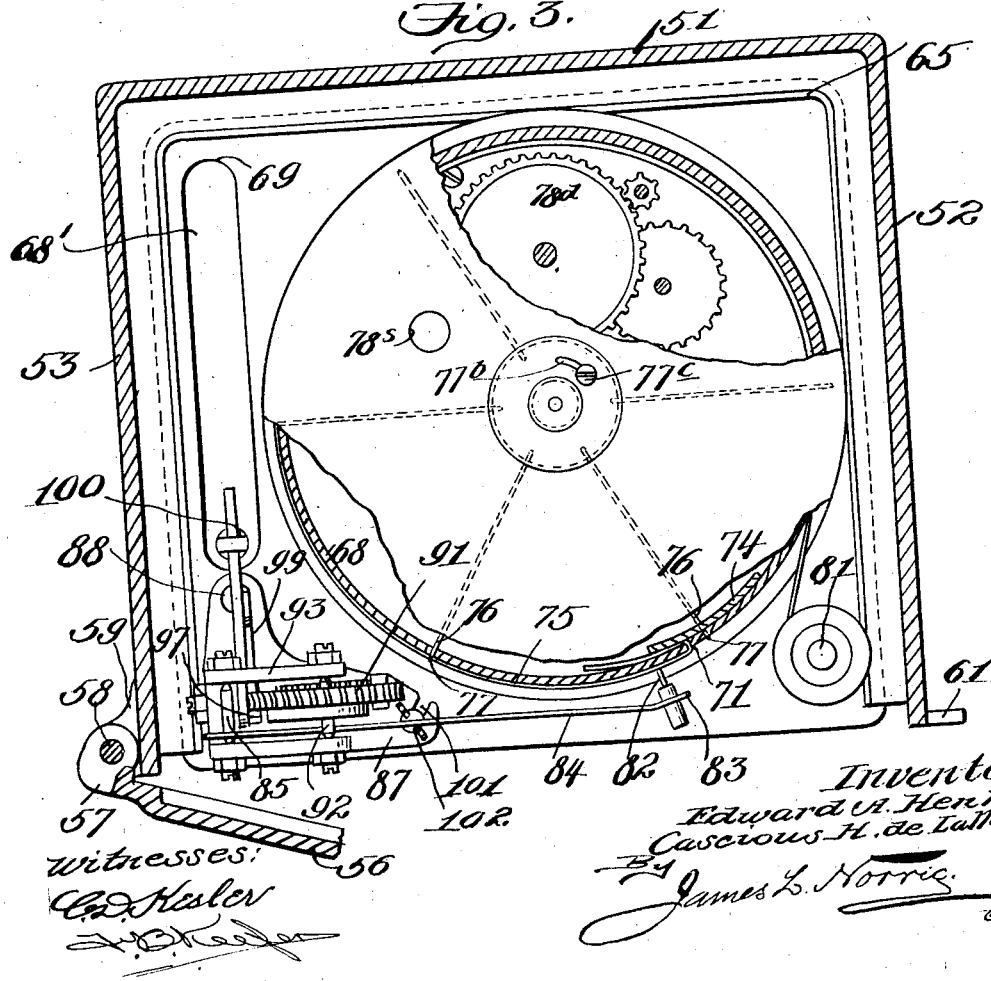

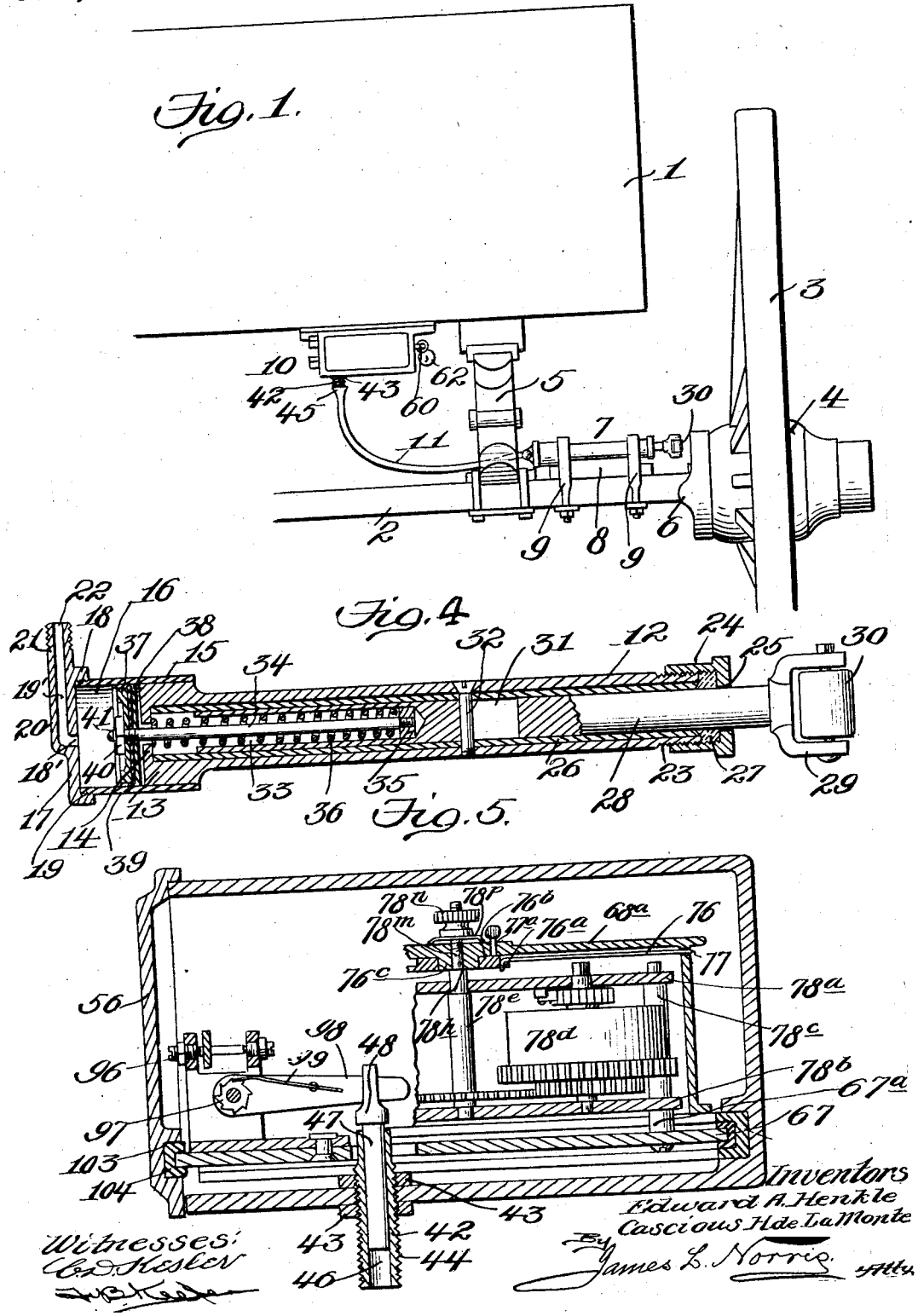

UNITED STATES PATENT OFFICE.

EDWARD A. HENKLE AND CASCIOUS H. DE LA MONTE, OF PHILADELPHIA, PENNSYLVANIA, ASSIGNORS TO INTERNATIONAL SPEED REGISTER CO., OF NEW YORK, N. Y., A CORPORATION OF NEW YORK.

SPEED-RECORDER.

No. 914,835.

Specification of Letters Patent.     Patented March 9, 1909.

Application filed December 5, 1907. Serial No. 405,255.

*To all whom it may concern:*

Be it known that we, EDWARD A. HENKLE, a citizen of the United States, residing at Philadelphia, Pennsylvania, and CASCIOUS H. DE LA MONTE, a citizen of Mexico, residing at Philadelphia, in the county of Philadelphia and State of Pennsylvania, have invented new and useful Improvements in Speed-Recorders, of which the following is a specification.

This invention relates to speed recorders, particularly adapted for use in connection with vehicles and for other purposes wherein it is found applicable.

One of the objects of the invention is to provide a speed recording instrument in a manner as hereinafter set forth for not only recording the speed of travel and the distance traveled, but also the time consumed in stoppages, all of which is very valuable as a detector to indicate the working time of the driver, to determine the number of miles the vehicle has traveled and the rates of speed at which the vehicle has been driven, whether fast or slow.

A further object of the invention is to provide an instrument of the class referred to with a fluid-pressure actuating means for operating the recording mechanism, said means being operated from a moving part of the vehicle and is unusually efficient in use.

With the foregoing and other objects in view, the invention aims to provide a combined speed, distance and time recorder, as termed a speed recording instrument, which shall be simple in its construction, strong, durable, operating in an accurate manner, thereby obtaining an accurate record, efficient in its use, of small compass, readily set up in operative position and comparatively inexpensive to manufacture.

In the accompanying drawings, wherein like reference characters denote corresponding parts throughout the several views:—

Figure 1 is an elevation of a portion of a vehicle showing the adaptation therewith of a speed recorder in accordance with this invention; Fig. 2 is a front elevation of a speed recorder in accordance with this invention, the mechanism being shown inclosed in a casing, the casing being illustrated in section; Fig. 3 is a sectional plan of a speed recorder in accordance with this invention; Fig. 4 is a longitudinal sectional view of the compressor, and, Fig. 5 is a longitudinal sectional view of the casing, also showing the actuating device for the operating means for the marker.

Referring to the drawings in detail, 1 denotes the body portion of a vehicle, 2 an axle, 3 a wheel, 4 a hub, 5 one of the vehicle springs and 6 a cam projecting inwardly from the inner end of the hub and adapted to actuate the compressor which will be hereinafter referred to. The compressor, which is generally referred to by the numeral 7, is mounted upon a block 8 placed upon the axle 2 and secured in position by the clamps 9. The time and distance recording mechanisms are inclosed in a casing 10, which as shown, is secured to the body 1 of the vehicle and said casing is connected to the compressor 7 through the medium of a conduit 11 in the form of a flexible tubing. By setting up the recorder in a manner as stated, the jars of the axle are not imparted directly to the time and distance mechanisms which reduces vibration to a minimum, and furthermore, the time and distance mechanisms are cushioned through the medium of the vehicle springs 5, which also materially assist in reducing vibration of the mechanisms to a minimum. Owing to the manner of arranging the speed recorder it insures a more accurate record than would be the case if the time and distance mechanisms were mounted directly upon the axle of the vehicle as is the mode now in general use. As the time and distance mechanisms are cushioned within the casing 10 and as the vehicle body is suspended upon a series of springs, it is evident that by suspending the time and distance mechanisms from the vehicle body or mounting the same upon said body, there is decidedly less chance of the said mechanisms being caused to vibrate to impair their accuracy than would be the case if such mechanisms were mounted directly upon the axle of the vehicle.

The compressor 7, which as before stated, is mounted upon the axle 2, embodies a hollow cylindrical body portion 12, enlarged at one end, as at 13, and the said enlarged end 13 is formed with an inwardly-extending annular flange 14. Secured to the enlarged end 13 is a tubular member 15 which is of a length as to project from the enlarged end 13 forming thereby a piston chamber 16. Secured to the tubular member 15 is a closure cap 17, the latter having an interiorly-screw-threaded annular flange 18 which engages with peripheral threads 19 formed on the member 15 at one end. The cap 17 is provided with a port 18' which opens into a channel 19' formed in an enlargement 20 upon the outer face of the cap 17. Formed integral with the enlargement 20 is a screw-threaded nipple 21 which constitutes a continuation of said enlargement, and the opening 22 through said nipple forms a continuation of the channel 19'. The smaller end of the body portion 12 is provided with peripheral threads 23 which are engaged by an interiorly-screw-threaded cap 24 having an opening 25 for a purpose to be hereinafter referred to. Arranged within the body portion 12 is a cylindrical bearing sleeve 26, one end of which terminates with one end of the body portion 12 and the other end abuts against the inwardly-extending annular flange 14. Arranged within the cap 24 is a suitable packing 27 which abuts against the alining end of the sleeve 26 and body portion 12. Extending through the opening 25 and into the bearing sleeve 26 is a plunger 28 of a diameter as to snugly fit said bearing sleeve, but at the same time allow of a reciprocatory movement of the said plunger. That end of the plunger 28 which is arranged exteriorly of the body portion 12 is provided with a yoke 29 carrying a friction roller 30 which is arranged in the path of the cam 6 so that during the rotation of the wheel 3 the cam 6 will intermittently engage the roller 30 and shift the plunger 28 in one direction within the bearing sleeve 26, the direction being toward the piston chamber 16. The plunger 28 intermediate its ends is formed with an opening 31 through which extends a stop pin 32 whereby the walls of said openings will limit the movement of the plunger in either direction—that is to say, a direction toward and away from the piston chamber 16. The stop pin 32 extends through the body portion 12 and bearing sleeve 26 and is shown in the form of a screw, although any other suitable form of stop can be employed. The plunger 28 is formed at one end with a socket 33 in which extends a piston rod 34 carrying on one end a nut 35. The piston rod 34 is of a length as to extend past the flange 14 and between the latter and the nut 35 and surrounding the piston rod 34 is a compression spring 36, the function of which is to shift the plunger in a direction away from the piston chamber 16. Secured to that end of the piston rod 34 which extends past the flange 14 is a piston formed of a pair of disks 37, 38, between which is clamped a packing cup 39, the said cup 39 inclosing the disk 37 and engaging the wall of the piston chamber. The disk 38 is secured to the piston rod 34, and the disk 37, as well as the packing cup 39, is clamped to the disk 38 through the medium of a nut 40 mounted upon the screw-threaded end 41 of the piston rod. As before stated, the spring 36 acts as a means to force the plunger away from the piston chamber 16. The spring 36 not only performs the function just set forth, but also acts as a means to move the piston toward the flange 14. From the foregoing construction and arrangement of parts it is evident that when the cam 6 engages the roller 39 the plunger 28 will be moved inwardly, the piston and the piston rod will be carried therewith, such action compressing the spring 36 between the nut 35 and the flange 14. When the cam 6 passes off the roller 30 the spring 36 will expand, therefore shifting the plunger 28 outwardly and the piston toward the flange 14.

The flexible tubing 11 is connected at one end to the nipple 21 and at its other end to a vertically-extending hollow member 42 which projects through the bottom of the casing 10 and is secured to said casing through the medium of clamping nuts 43. The hollow member 42 is provided with peripheral threads 44 which are engaged by the nut 43 and also by the coupling 45. The latter is carried by the flexible tube 11. The hollow member 42 constitutes a piston chamber 46 in which is reciprocated a piston 47, termed a fluid-pressure operated device. The piston 47 is of a length as to project from the member 42 and the said projecting end is enlarged as at 48 to constitute a stop for the movement in one direction of the piston 47, the said enlarged end 48 engaging the top edge of the member 42.

The time and distance recording mechanisms are mounted, as before stated, in the casing 10, the latter having its top formed with laterally-extending lugs 50 through which is adapted to extend holdfast devices for securing the casing 10 in position. The casing 10 embodies a rear wall 51, side walls 52, 53, a top 54 and a bottom 55. The front wall of the casing 10 is in the form of a closure plate 56 having laterally-extending lugs 57 which are hinged through the medium of a pintle 58 to the apertured lugs 59 projecting from the wall 53. The closure plate 56 is furthermore provided with an apertured lug 60 which abuts against an apertured lug 61 formed upon the wall 52 and the said lugs 60, 61 are connected together through the medium of lock 62. The casing 10 is furthermore provided with a ledge 63 arranged near the lower end of the side and rear walls, the said ledge being continuous. Above the ledge 63 is an inwardly-extending flange 64 of the same contour as the ledge 63 and between the flange 64 and ledge 63 is positioned a cushioning element 65 in which is arranged a U-shaped member 66, the latter constituting a support for the base plate 67 which carries the time and distance mechanisms. The cushioning 65, in connection with the U-shaped member 66 forms a suspension means for the base plate 67, as well as means to prevent vibration of said plate 67. By providing the U-shaped member 66, the base plate, when the cover 56 is swung open, can be withdrawn from the casing 10, but to prevent the withdrawal of the base plate 67 entirely from the casing 10 the said base plate 67 is formed with an elongated slot 68', the rear wall 69 of which is adapted to engage with the inner end of the tubular member 42. The base plate 67 is withdrawn when it is desired to remove the record or to wind the time mechanism, or to position a record tape or to adjust any of the mechanisms arranged within the casing 10.

The time and distance recording mechanisms comprise a rotatable tape carrier traveling at a predetermined rate of speed, a tape-carrying spool from which the tape is unwound as it winds upon the carrier, a marker operating transversely with respect to the tape, an oscillatory lever for the marker, shifting means for the lever and an operating mechanism for said shifting means, said operating mechanism being operated by the fluid-pressure actuated device. The rotatable tape carrier which travels at a predetermined rate of speed consists of a drum 68, having a peripheral flange at its top and bottom, as at 69', 70. The body portion of the drum 68 is formed with a transversely extending slit 71 and circumferentially-extending slit 72, this latter forming a spring tongue 73. The inner face 73 has secured thereto a retaining strip 74 which projects past the slit 71. The function of the slit 71, in connection with the spring tongue 73 and retaining strip 74, is to provide means whereby one end of the record tape 75 can be attached to the body of the drum, and in this connection it will be stated that the end of the record tape 75 is inserted through the slit 71 and bent against the face of the body portion of the drum. This manner of positioning the tape can be accomplished by pressing inwardly the tongue 73 which allows of the insertion of the end of the tape 75 in the drum. After the end of the record tape is bent to engage the inner face of the body portion of the drum, the spring tongue 73 is released and the projecting end of the retaining strip 75 overlaps the end of the record tape which engages the inner face of the body portion of the drum. To prevent the shifting of the record tape 75 when positioned upon the drum 68 a plurality of radially disposed holding arms 76 is employed, each provided with a pointed end 77. Said arms extend through the body portion of the drum 68 and puncture the tape. The inner ends of the arm 76 are pivotally connected to an annular flange 76ª projecting from a disk 76ᵇ surrounding a boss 76ᶜ depending approximately centrally from the inner face of the top 68ª of the drum 68. The disk 76ᵇ carries a vertically extending pin 77ª which extends through a segment-shaped slot 77ᵇ formed in the top 68ª of the drum 68. The pin 77ª is of such length as to project from the outer face of the top 68ª of the drum 68 and carries on its outer end a thumb or finger piece 77ᶜ, whereby said pin 77ª can be conveniently shifted in the slot 77ᵇ. If the pin 77ª is shifted in one direction, the disk 76ᵇ can be carried therewith, thereby moving the arms 76 inwardly. If the pin 77ª be shifted in an opposite direction, the disk 76ᵇ will be carried therewith, thereby projecting the arms so that the pointed ends thereof will engage the tape. The disk 76ᵇ frictionally engages the boss 76ᶜ, whereby the said disk is retained in proximity to the top 68ª of the drum 68, but it is evident that the outer ends of the arms 76 further assist in maintaining the disk 76ᵇ in position and further the thumb piece 77ᶜ also acts as a retaining means for the disk in case the disk should drop, as the finger or thumb piece 77ᶜ is of such diameter as to prevent its passage through the slot 77ᵇ.

The drum 68, as before stated, travels at a predetermined rate of speed and for such purpose a spring motor mechanism or what may be termed a clock train is provided and which is positioned between a pair of pillar plates 78ª and 78ᵇ which are spaced apart through the medium of the pillars 78ᶜ. The pillar plate 78ᵇ is supported upon the base plate 67 through the medium of the members 67ª. The spring motor mechanism which is indicated by the reference character 78ᵈ is geared with a shaft 78ᵉ to which the drum 68 is frictionally connected so that during the rotation of the shaft 78ᵉ the drum 68 will be revolved. The shaft 78ᵉ is provided with a shoulder 78ʰ upon which rests the boss 76ᶜ. The shaft 78ᵉ at its upper end is reduced as well as screw-threaded, the said reduced end being indicated by the reference character 78ᵐ and extends through the top 68ª of the drum. The screw-threaded end 78ᵐ of the drum. The screw-threaded end 78ᵐ of the drum. The screw-threaded end 78ᵐ of the shaft 78ᵉ carries a thumb nut 78ⁿ between which and the top 68ª of the drum 68 is mounted a spring member 78ᵖ. By screwing the nut 78ⁿ downwardly upon the end 78ᵐ it will cause a binding engagement between the member 78ᵖ and the nut and the top of the drum so that the drum will be frictionally connected to the shaft and rotate therewith. The top 68ª of the drum 68 is provided with an opening 78ˢ to enable access to be had to the winding staff 78ˣ of the spring motor mechanism. In this connection it will be stated that if the opening 78ˢ is not positioned with respect to the winding staff so that the latter could be engaged by a key to wind the mechanism, the drum 68 can be shifted manually until the opening 78ˢ is in proper position.

The tape spool is indicated by the reference character 80 and is frictionally supported in a known manner upon a post 81 secured to the plate 67. The spool 80 is arranged in such relation with respect to the drum 68 that during the rotation of the drum, the tape will be carried by the spool 80 will be drawn off and then wound upon the drum. The tape 75 has one face formed with a series of vertically and longitudinally extending lines respectively so as to form vertically and longitudinally extending rows of spaces indicating time and distance. The vertically extending row of spaces is designed to record four miles, thus shortening up the length of the record for each day. Each space indicates a fraction of an hour and a fraction of a mile.

The transversely-operable marker is indicated by the reference character 82 and which extends radially with respect to the axis of the drum 68. The marker 82 is positioned so as to engage the tape 73, as clearly shown in Fig. 3 and is carried in the angular end 83 of the oscillatory lever 84. The latter at its rear end is mounted upon a pivot 85 secured to the uprights 86 which extend from a supporting plate 87 pivoted as at 88 upon the base plate 67. The lever 84 is provided with an inwardly-extending stud 89 engaging in a heart-shaped race 90 which is formed in one side of a worm gear 91 which is mounted upon a shaft 92 journaled in a pair of angular arms 93 projecting from the uprights 86. The worm gear 91 and heart-shaped race 90, in connection with the stud 89, constitutes a shifting means for the lever 84. The operating means for the worm gear 91 consists of a worm shaft 94 journaled in an upright 95 and in a support 96 which are carried by the supporting plate 87. The worm shaft 94 is provided with a ratchet wheel 97 and is surrounded by one end of an oscillatory lever 98 which carries a pawl 99 for engaging with the ratchet wheel 97 to cause a rotation of the shaft 94 when the said lever 98 is oscillated. The other end of the lever 98 extends through the projecting end of the piston 47, as at 100 thereby when the said piston 47 is actuated in one direction an impulse will be given to the shaft 94 and the worm gear 91 will be rotated. The worm shaft 94, ratchet wheel 96, lever 98 and spring 99 constitute the operating means for the shifting means for the lever 84. The supporting plate 87 is notched, as at 101, for engagement with a binding screw 102 whereby said plate 87 can be fixedly secured in the position shown in Fig. 3. The pivoting of the plate 87 provides means whereby said plate can be shifted upon its pivot so that access can be had to the drum 68 to remove or position the tape 73. This shifting of the plate 87 can be had when the binding screw 102 is loosened. The said screw 102 is carried by the base plate 67.

To provide a cushioning means for the forward end of the base plate 67 the inner face of the closure plate 56 is formed with a pocket 103 in which is mounted a cushioning element 104 adapted to engage the forward end of the base plate 67 as clearly shown in Fig. 5.

The tape carrier is adapted to make a complete revolution, say by way of example every eighteen hours, although the rate of speed of the drum can be increased or diminished if desired.

When the vehicle is standing still the operating mechanism for the marker is not in operation, but the drum still continues to operate, owing to the fact that the operation of the mechanism for rotating the drum is not discontinued. As the drum rotates it causes the tape to wind off the spool and upon the drum, but the duration of the stoppage of the vehicle will be indicated, owing to the fact that the marker will make a line extending in a longitudinal direction upon the tape and through one or more spaces, and by way of example it will be assumed that such line extends through three spaces in a longitudinal direction. This will indicate that the duration of the stoppage of the vehicle is fifteen minutes, as each of the spaces indicates five minutes.

It will now be assumed that the vehicle is traveling and the plunger 28 operated. The actuation of the plunger will operate the compressor, the latter by way of example is shown as an air compressor, and shift the piston 47 upwardly, thereby moving the lever 98 in one direction and imparting an impulse to the shaft 94, which in turn will rotate the gear wheel 91 and the latter shift the lever 84 and the marker 82 in a manner as hereinbefore referred to. The actuation of the plunger 28 is caused by the cam 6 engaging with the roller 30. When the cam 6 moves off the roller 30 the spring 36 will expand, consequently drawing the piston within the piston chamber 36 rearwardly, allowing of the compressed fluid to expand and forming a partial vacuum in the conduit 11 which will cause the piston 47 to lower, moving the lever 98 therewith. Every revolution of the vehicle wheel will impart movement to the marker. As the wheel revolves very rapidly the mark upon the tape will extend in an approximately vertical direction. If the speed is lessened the mark will be at an inclination and if the vehicle stops the mark will be straight and extend in a longitudinal direction.

What we claim is—

1. A speed recorder embodying a rotatable tape carrying drum provided with a spring tongue and a retaining strip for connecting one end of a record tape thereto, a frictionally held spool arranged in operative relation with respect to said drum and off which the tape is withdrawn while winding upon the drum, a marker mechanism arranged in operative relation with respect to the tape carrier by the drum, and a reciprocatory piston connected with the marker mechanism for operating it.

2. A speed recorder embodying a rotatable tape carrying drum provided with a spring tongue and a retaining strip for connecting one end of a record tape thereto, a spool arranged in operative relation with respect to said drum and off which the tape is withdrawn while winding upon the drum, a marker mechanism arranged in operative relation with respect to the tape carrier by the drum, a reciprocatory piston connected with the marker mechanism for operating it, and a fluid-compressing means operatively connected with said piston for reciprocating it.

3. An instrument of the class described comprising a removable cushioned supporting plate, a casing for said plate, a rotatable record tape carrier traveling at a predetermined rate of speed and supported upon said plate, an oscillatory lever arranged in operative relation with respect to said carrier and provided with a marker engaging the tape upon the carrier and further provided with a protuberance, said lever pivotally supported upon said plate, a gear wheel supported upon the plate on an axis extending at right angles with respect to the axis of the carrier, said gear wheel provided with means adapted to engage with said protuberance for oscillating the lever, mechanism engaging with the gear wheel for rotating it, and means for operating said mechanism.

4. An instrument of the class described comprising a removable cushioned supporting plate, a casing for said plate, a rotatable record tape carrier traveling at a predetermined rate of speed and supported upon said plate, an oscillatory lever arranged in operative relation with respect to said carrier and provided with a marker engaging the tape upon the carrier and further provided with a protuberance, said lever pivotally supported upon said plate, a gear wheel supported upon the plate on an axis extending at right angles with respect to the axis of the carrier, said gear wheel provided with means adapted to engage with said protuberance for oscillating the lever, a rotatable worm shaft supported upon said plate and engaging with said gear wheel for revolving it, a lever and ratchet mechanism adapted when actuated to rotate the worm shaft, and means for actuating the lever and ratchet mechanism.

5. An instrument of the class described comprising a removable cushioned supporting plate, a casing for said plate, a rotatable record tape carrier traveling at a predetermined rate of speed and supported upon said plate, an oscillatory lever arranged in operative relation with respect to said carrier and provided with a marker engaging the tape upon the carrier and further provided with a protuberance, said lever pivotally supported upon said plate, a gear wheel supported upon the plate on an axis extending at right angles with respect to the axis of the carrier, said gear wheel provided with means adapted to engage with said protuberance for oscillating the lever, a rotatable worm shaft supported upon said plate and engaging with said gear wheel for revolving it, a lever and ratchet mechanism adapted when actuated to rotate the worm shaft, and a fluid pressure operated reciprocatory piston engaging with said lever and ratchet mechanism for actuating it.

6. A speed recorder comprising a casing having an entrance opening at one end, a removable cushioned supporting plate arranged within said casing, a door for the casing, said plate provided with an elongated slot, a rotatable record tape carrier supported by said plate, an oscillatory lever provided with a marker adapted to record upon the tape upon the carrier, means supported by said plate for oscillating said lever, and a reciprocatory piston extending through the slot of said plate and engaging with said means for operating it whereby oscillations are imparted to the lever.

7. A speed recorder comprising a casing having an entrance opening at one end, a removable cushioned supporting plate arranged within said casing, a door for the casing, said plate provided with an elongated slot, a rotatable record tape carrier supported by said plate, an oscillatory lever provided with a marker adapted to record upon the tape upon the carrier, means supported by said plate for oscillating said lever, and a reciprocatory piston extending through the slot of said plate and engaging with said means for operating it whereby oscillations are imparted to the lever, said means being removably mounted upon said plate.

8. A speed recorder for traveling vehicles comprising a record tape carrier, a clock mechanism for rotating the carrier at a predetermined rate of speed whereby the tape will be wound upon the carrier, an oscillatory lever having one end pivoted and at its other end carrying a marker operating in a plane parallel to the tape upon the carrier, a rotatable element mounted on an axis at right angles to the axis of the carrier and engaging said lever at a point between its pivot and that end carrying the marker for oscillating it, and means operated from a moving part of the vehicle for operating said element.

9. A speed recorder for traveling vehicles comprising a rotatable record tape carrier, a clock mechanism for rotating the carrier at a predetermined rate of speed whereby the tape will be wound upon the carrier, an oscillatory pivoted lever having a stud intermediate the ends thereof, said lever pivoted at one end and having its other end provided with a marker operating in a plane parallel to the tape upon the carrier, a rotatable element mounted on an axis at right angles to the axis of the carrier and provided with a cam groove in which extends said stud whereby said lever is oscillated when said element is rotated, and means actuated from a moving part of the vehicle for operating said element.

10. A speed recorder for traveling vehicles comprising a record tape carrier, a clock mechanism for rotating the carrier at a predetermined rate of speed whereby the tape will be wound upon the carrier, an oscillatory pivoted lever having one end carrying a marker operating in a plane parallel to the tape upon the carrier, a rotatable element mounted on an axis at right angles to the axis of the carrier and provided with a cam groove, a stud carried by said lever intermediate its ends and engaging in said groove whereby said lever is oscillated when said element is rotated, and a fluid pressure operated piston connected with said element for operating it.

11. A speed recorder for traveling vehicles comprising a rotatable record tape carrier, a clock mechanism for rotating the carrier at a predetermined rate of speed whereby the tape will be wound upon the carrier, an oscillatory pivoted lever having a stud intermediate the ends thereof, said lever pivoted at one end and having its other end provided with a marker operating in a plane parallel to the tape upon the carrier, a rotatable element mounted on an axis at right angles to the axis of the carrier and provided with a cam groove in which extends said stud whereby said lever is oscillated when said element is rotated, and a fluid pressure operated piston connected with said element for operating it.

12. A speed recorder for traveling vehicles comprising a record tape carrier, a clock mechanism for rotating the carrier at a predetermined rate of speed whereby the tape will be wound upon the carrier, an oscillatory pivoted lever having one end carrying a marker operating in a plane parallel to the tape upon the carrier, a rotatable element mounted on an axis at right angles to the axis of the carrier and provided with a cam groove, a stud carried by the lever intermediate the ends thereof and engaging in said groove whereby said lever is oscillated when said element is rotated, an air compressor embodying a piston chamber and a spring-controlled piston operating in said chamber, said piston actuated by a moving part of the vehicle for compression and consumption by its controlling spring, a hollow member, a conduit between said member and said chamber, and a fluid pressure operated reciprocatory piston extending in said member and operatively connected with said rotatable element for operating the latter.

13. A speed recorder for traveling vehicles comprising a rotatable record tape carrier, a clock mechanism for rotating the carrier at a predetermined rate of speed whereby the tape will be wound upon the carrier, an oscillatory pivoted lever having a stud intermediate the ends thereof, said lever pivoted at one end and having its other end provided with a marker operating in a plane parallel to the tape upon the carrier, a rotatable element mounted on an axis at right angles to the axis of the carrier and provided with a cam groove in which extends said stud whereby said lever is oscillated when said element is rotated, an air compressor embodying a piston chamber and a spring-controlled piston operating in said chamber, said piston actuated by a moving part of the vehicle for compression and consumption by its controlling spring, a hollow member, a conduit between said member and said chamber, and a fluid pressure operated reciprocatory piston extending in said member and operatively connected with said rotatable element for operating the latter.

In testimony whereof we have hereunto set our hands in presence of two subscribing witnesses.

EDWARD A. HENKLE.
CASCIOUS H. DE LA MONTE.

Witnesses:
JUNIUS HOWE,
WALTER H. JACKSON.